UNITED STATES PATENT OFFICE.

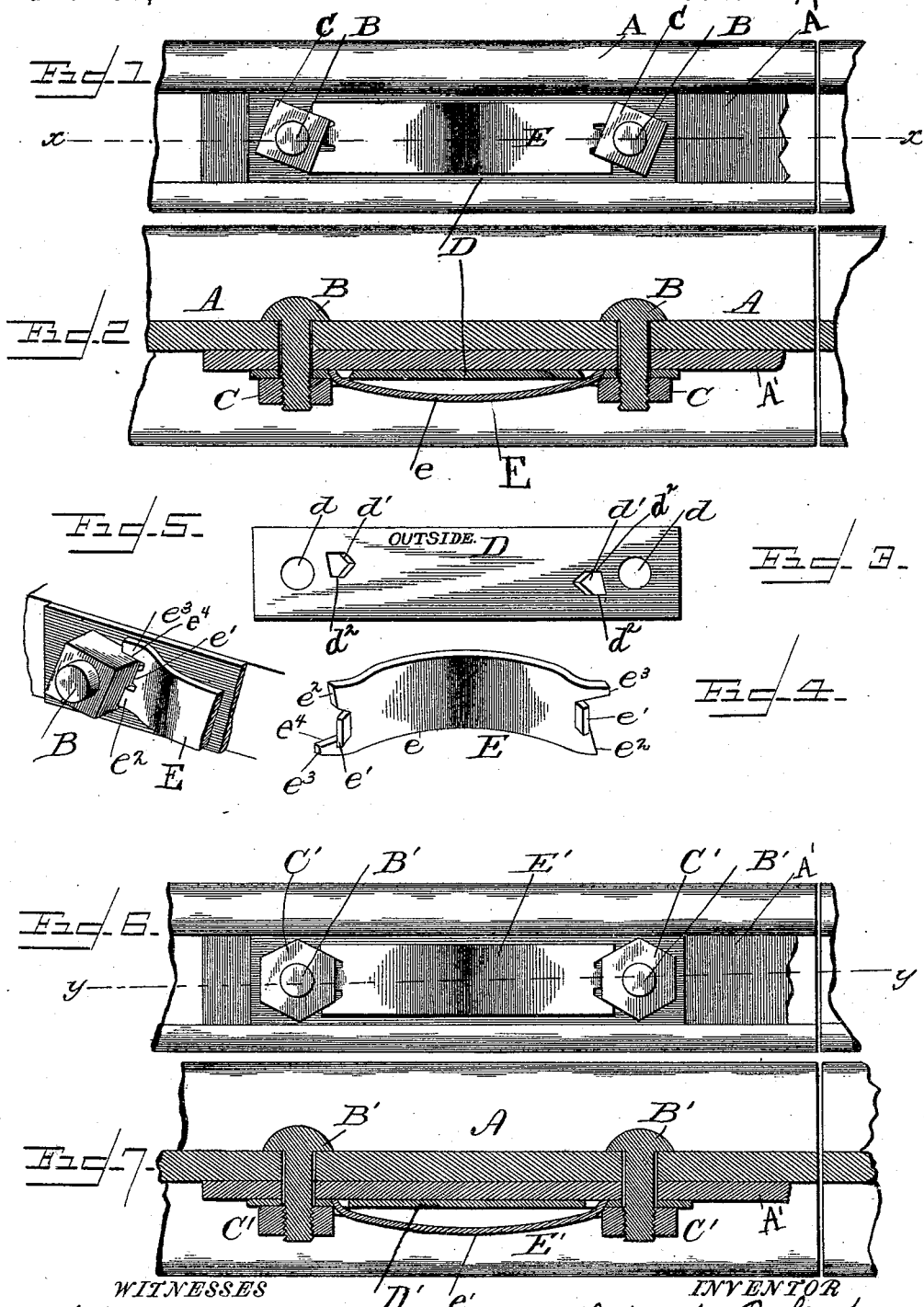
(No Model.) 2 Sheets—Sheet 1.
J. W. B. COOK.
NUT LOCK.
No. 490,740. Patented Jan. 31, 1893.
WITNESSES
INVENTOR
John W. B. Cook,
by Whitman & Wilkinson
Attorneys.

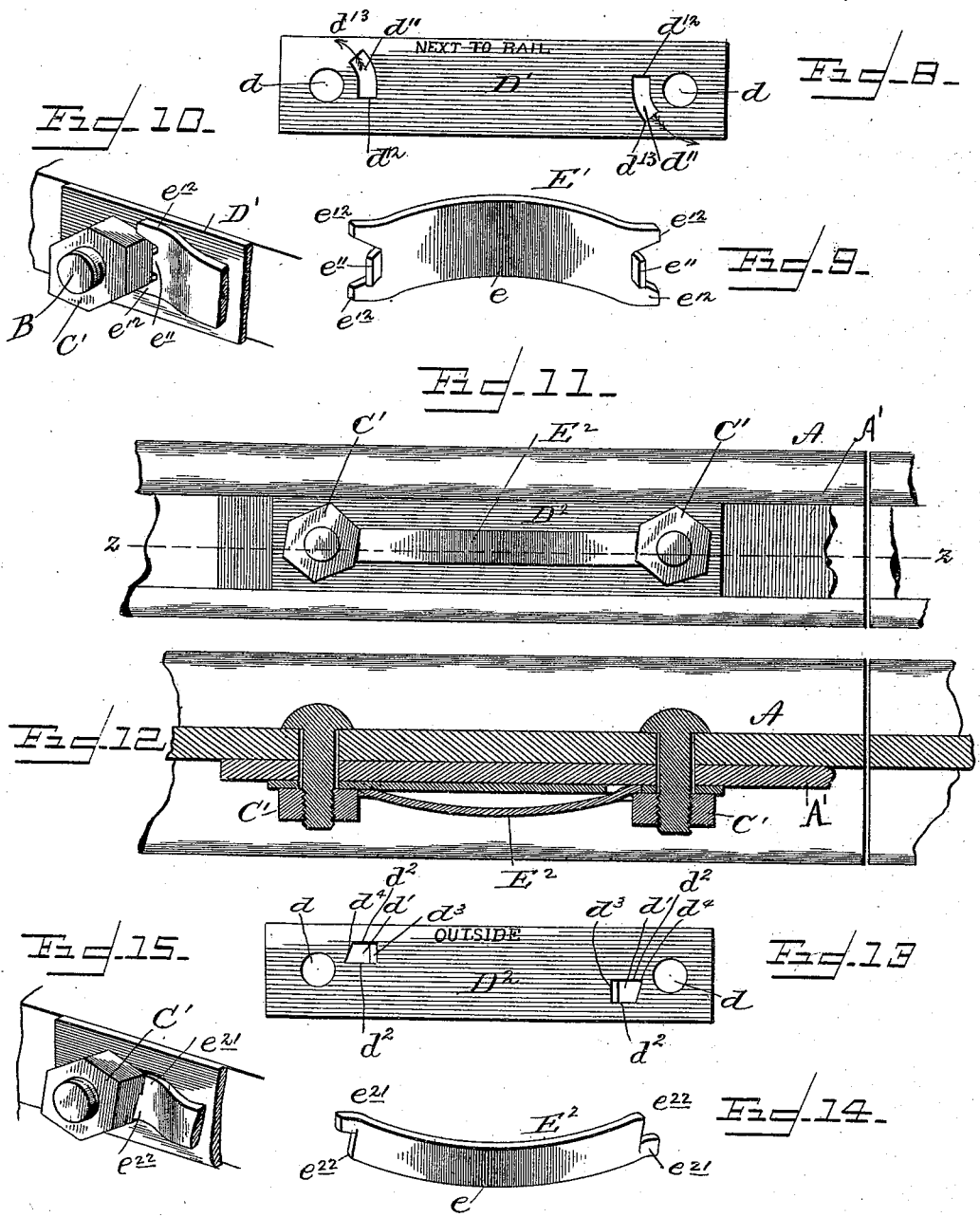

JOHN W. B. COOK, OF CAMDEN, ARKANSAS.

NUT-LOCK.

SPECIFICATION forming part of Letters Patent No. 490,740, dated January 31, 1893.

Application filed June 14, 1892. Serial No. 436,690. (No model.)

*To all whom it may concern:*

Be it known that I, JOHN W. B. COOK, a citizen of the United States, residing at Camden, in the county of Ouachita and State of Arkansas, have invented certain new and useful Improvements in Nut-Locks; and I do hereby declare the following to be a full, clear, and exact description of the invention, such as will enable others skilled in the art to which it appertains to make and use the same.

My invention relates to improvements in nut locks, and it consists of certain novel features hereinafter described and claimed.

Reference is to be had to the accompanying drawings, wherein the same parts are indicated by the same letters throughout the several views.

Figure 1 represents a side elevation of a portion of a rail near the joint, and illustrates the operation of my nut lock. Fig. 2 represents a section of Fig. 1 along the line $x\ x$ looking down. Fig. 3 represents a plan of the washer plate. Fig. 4 represents a perspective view of the tongued brace, which with the said washer plate, constitutes the nut-lock. Fig. 5 represents a perspective view of a square nut with the brace engaging the ends thereof. Fig. 6 represents a side view of a rail, &c., and illustrates my invention as applied to hexagonal nuts. Fig. 7 represents a section of Fig. 6, along the line $y\ y$ looking down. Fig. 8 represents a plan view of the washer plate, as seen from the side next the rail; and Fig. 9 represents a perspective view of the brace as seen from the under side, which with the washer plate shown in Fig. 8 together form the nut lock. Fig. 10 represents a perspective view of the nut lock shown in Figs. 6, 7, 8, and 9, as locking a hexagonal nut. Fig. 11 represents a side elevation of the rail and fish plate, and shows a modification of the nut lock, which is adapted for use with nuts having any number of sides. Fig. 12 represents a section of the device shown in Fig. 11, along the line $z\ z$ of said figure. Fig. 13 represents a plan of the washer plate; and Fig. 14 a perspective view of the brace, which with the washer plate, constitutes the nut lock; and Fig. 15 represents a perspective view of one end of the nut lock in operation.

A represents the rail.

B represents one of the bolts used in holding together the rail A and the fish plate A′, there are usually two of these bolts on either side of the joint between the rails, and between these bolts the washer plate D and brace E are placed.

C represents one of the nuts to be locked.

The washer plate D has two holes $d$ just large enough for the ends of the bolts B to pass through freely, and between these two circular holes $d$, holes $d'$ having sides $d^2$ parallel to the length of the rail, are provided.

The brace E has a tongue $e'$ adapted to engage in these holes $d'$, a projecting shoulder $e^2$ adapted to bear against one face of the nut, and a projecting arm $e^3$ having a side $e^4$ adapted to bear against another face of the nut.

The operation of the device is as follows:— The bolts B are inserted through the rails A and fish plates A′, the washer plate D is put on, and the nuts C are screwed down in place. The tongue $e'$ is slipped into the hole $d'$ at the base of one of the nuts, and the opposite tongue is sprung into the opposite hole, which may be done by bending up the brace E and hammering it on the curved portion until the said tongue is in place, or by simply allowing the said tongue to spring in place when the said brace is bent up as shown in Fig. 2. This brace should preferably be made of resilient metal. The brace being in place, if the nut is turned back a sufficient distance to have one side of the said nut bear against the shoulder $e^2$, the nut will be unable to turn any farther, and at the same time the tongue $e'$ will engage under the nut and prevent the brace from being accidentally detached. The arm $e^3$, will also engage another side of the nut, and prevent the same from turning, while any tendency of the nut to throw the brace up to the left, will be resisted by the side walls $d^2$ of the holes $d'$. It will be seen that the resiliency of the metal brace E will compensate for any losses due to wear.

In order to unscrew the nuts, place a crowbar, or other lever under the curved portion $e$ of the brace E, and pry the brace out of engagement in the holes $d'$.

The device shown in Figs. 6, 7, 8, 9, and 10, differs from the above only in the fact that the hexagonal nut C′ is wedged between two arms $e^{12}$, while the tongue $e^{11}$ engages in a hole $d^{11}$ in the washer plate D' as before. Further provision is made for throwing the brace E' out of engagement as the nut is screwed up, by having the hole $d^{11}$ curved as shown in Fig. 8. When the nut is screwed up or turned in the direction of the arrow, the tongue $e^{11}$ slips out of the end $d^{13}$ of the said hole, but when the nut is turned in the opposite direction, as in unscrewing the same, the tongue $e^{11}$ brings up against the face $d^{12}$ of the said slot and holds the brace E' in its position of greatest compression. This form of device may be disengaged by either screwing up on the nut as shown, or by prying under the curved portion $e$ of the brace E' as described with reference to Figs. 1 and 2.

In Figs. 11 to 15, the washer plate $D^2$ is provided with holes $d'$ having parallel sides $d^2$ as before, sloping sides $d^3$, and wedge shaped sides $d^4$. The brace $E^2$ has symmetrical shoulders $e^{22}$ on opposite ends, and tongues $e^{21}$ obversely disposed. These tongues engage in the holes $d'$ under the nuts, and the shoulders $e^{22}$ bear against the face of the nut, and prevent it from turning. Any tendency of the nut to throw the brace off to the left, is resisted by the parallel sides $d^2$ of the said holes $d'$ and the wedge sides $d^4$ tend to tauten the resilient metal plate $E^2$ by compressing the same. With this form of device it will be seen that the nut may be screwed up taut, and the brace sprung into position as before. In order to unscrew the nut, pry up under the curved portion of the brace, disengaging the tongues $e^{21}$.

It will be seen that all of the said devices are reversible, and accidents can not occur due to mistakes in placing the various parts.

It will only be necessary to have the washer plates stamped with some symbol indicative of which side goes next to the rail. This we have indicated by "outside," and "next to rail" in Figs. 3, 8 and 13.

Having thus described my invention, what I claim, and desire to secure by Letters Patent of the United States, is:—

1. In a nut lock, the combination with two nuts of a washer plate lying between and passing beneath both of said nuts, the said washer plate having a hole therein near each nut and partially covered by the said nut; and a brace made of resilient metal somewhat longer than the distance between the said nuts and having at each end a tongue adapted to be sprung into said holes in the washer plate and to be partially covered by said nuts, and a bearing face adapted to press against one of the faces of the said nuts, substantially as and for the purposes described.

2. In a nut lock, the combination with two bolts and nuts, of a washer plate $D^2$ having holes $d$ registering with said bolts and adapted to allow the same to enter freely, and holes $d'$ with parallel sides $d^2$ and sloping side $d^3$, the said holes being partially covered by the said nuts; the brace $E^2$ made of resilient material and having bent arms $e^{21}$ and bearing faces $e^{22}$, the said arms fitting in the said holes $d'$ and being partially covered by the said nuts, and each of the said bearing faces bearing against one of the sides of a nut, substantially as and for the purposes described.

In testimony whereof I affix my signature in presence of two witnesses.

JOHN W. B. COOK.

Witnesses:
J. R. CONNOLE,
Z. T. DUNCAN.